United States Patent
Nishikawa et al.

(10) Patent No.: US 8,942,203 B2
(45) Date of Patent: Jan. 27, 2015

(54) TRANSMISSION POWER CONTROL METHOD, MOBILE TERMINAL APPARATUS AND RADIO BASE STATION APPARATUS

(75) Inventors: Daisuke Nishikawa, Tokyo (JP); Yoshihisa Kishiyama, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 122 days.

(21) Appl. No.: 13/703,635

(22) PCT Filed: Jun. 16, 2011

(86) PCT No.: PCT/JP2011/063805
§ 371 (c)(1),
(2), (4) Date: Jan. 7, 2013

(87) PCT Pub. No.: WO2011/162156
PCT Pub. Date: Dec. 29, 2011

(65) Prior Publication Data
US 2013/0100842 A1    Apr. 25, 2013

(30) Foreign Application Priority Data
Jun. 21, 2010  (JP) ................. 2010-141062

(51) Int. Cl.
*H04W 52/08* (2009.01)
*H04W 52/14* (2009.01)
(Continued)

(52) U.S. Cl.
CPC ........... *H04W 52/146* (2013.01); *H04W 52/16* (2013.01); *H04W 52/247* (2013.01); *H04W 52/248* (2013.01); *H04L 5/001* (2013.01); *H04W 52/243* (2013.01); *H04W 52/241* (2013.01); *H04W 52/08* (2013.01); *H04W 52/34* (2013.01); *H04L 5/0007* (2013.01)

USPC ............ 370/330; 370/328; 370/329; 455/522

(58) Field of Classification Search
None
See application file for complete search history.

(56) References Cited

U.S. PATENT DOCUMENTS

| | | | |
|---|---|---|---|
| 6,173,162 | B1 | 1/2001 | Dahlman et al. |
| 2004/0037262 | A1 | 2/2004 | Tanada |

FOREIGN PATENT DOCUMENTS

| | | | |
|---|---|---|---|
| JP | 2002-503427 A | 1/2002 |
| JP | 2003-069531 A | 3/2003 |

(Continued)

OTHER PUBLICATIONS

3GPP TSG RAN WG1 Meeting #59bis, R1-100322, Valencia, Spain, Jan. 2010, pp. 1-8.*

(Continued)

*Primary Examiner* — Donald Mills
(74) *Attorney, Agent, or Firm* — Osha Liang LLP

(57) ABSTRACT

It is an object to provide a transmission power control method, mobile terminal apparatus and radio base station apparatus for enabling a mobile terminal apparatus that performs radio communications in a system band including a plurality of component carriers to suitably control uplink transmission power in each component carrier, and a transmission power control method of controlling uplink transmission power of a mobile terminal apparatus that performs radio communications in a system band including a plurality of component carriers is provided with the steps of receiving a transmission power control command generated in a radio base station apparatus, and applying the received transmission power control command to a plurality of component carriers in common and setting transmission power of each component carrier.

11 Claims, 14 Drawing Sheets

(51) Int. Cl.
*H04W 52/16* (2009.01)
*H04W 52/24* (2009.01)
*H04L 5/00* (2006.01)
*H04W 52/34* (2009.01)

(56) References Cited

FOREIGN PATENT DOCUMENTS

| JP | 2008-109406 A | 5/2008 |
|---|---|---|
| WO | 2010/025681 A1 | 3/2010 |

OTHER PUBLICATIONS

3GPP TSG RAN WG1 Meeting #59bis, R1-100244, Valencia, Spain, Jan. 2010, pp. 1-4.*
3GPP TSG RAN WG1 Meeting #59bis, R1-100216, Valencia, Spain, Jan. 2010, pp. 1-5.*
3GPP TSG RAN WG1 Meeting #59bis, R1-100178, Valencia, Spain, Jan. 2010, pp. 1-4.*
Notification of Reasons for Rejection in corresponding Japanese application No. 2010-141062 dated May 7, 2013 (5 pages).
Office Action issued in Japanese Patent Application No. 2010-141062, mailing date Dec. 10, 2013, with English translation thereof (5 pages).
International Search Report issued in PCT/JP2011/063805 mailed Jul. 26, 2011 (2 pages).
Samsung; "UL Transmission Power Control in LTE-A"; 3GPP TSG RAN WG1 #58bis, R1-094086; Miyazaki, Japan; Oct. 12-16, 2009 (5 pages).
3GPP TS 36.213 V8.7.0; "3rd Generation Partnership Project; Technical Specification Group Radio Access Network; Evolved Universal Terrestrial Radio Access (E-UTRA); Physical layer procedures (Release 8)"; May 2009; pp. 9-15 (8 pages).

* cited by examiner

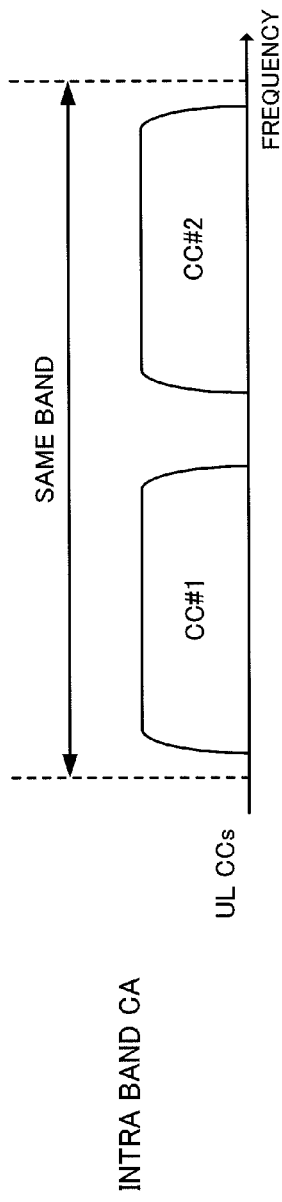
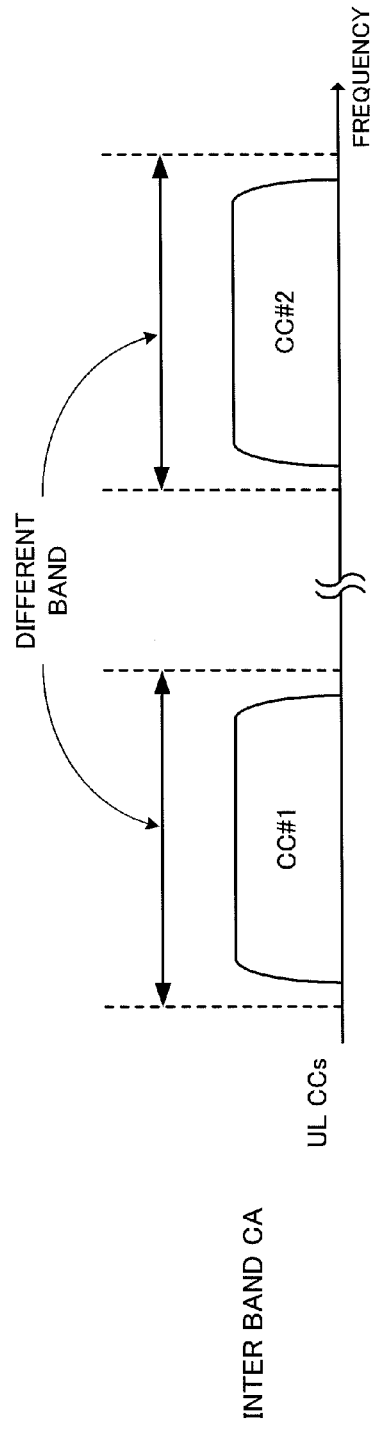

TRANSMISSION POWER CONTROL METHOD, MOBILE TERMINAL APPARATUS AND RADIO BASE STATION APPARATUS

TECHNICAL FIELD

The present invention relates to a transmission power control method, mobile terminal apparatus and radio base station apparatus for controlling uplink transmission power of the mobile terminal apparatus.

BACKGROUND ART

In LTE (Long Term Evolution) systems specified in the 3GPP (3rd Generation Partnership Project), in uplink is adopted SC-FDMA (Single-Carrier Frequency Division Multiple Access) which actualizes low Peak-to-Average Power Ratio (PAPR) and is effective at increasing coverage. Accordingly, by scheduling in a radio base station apparatus (BS: Base Station), basically, the base station allocates radio resources of some frequency and some time to a single mobile terminal apparatus (UE: User Equipment), and therefore, users in the same cell are orthogonal to one another in the frequency domain and time domain. However, in the LTE systems, since one cell frequency reuse is a base, interference from peripheral cells is large, and particularly, an interference level from a UE present at the cell edge is high. Therefore, measures against inter-cell interference are required in order to compensate for such peripheral cell interference and maintain certain reception quality.

As inter-cell interference measures, the role performed by uplink transmission power control is significant, and in consideration of propagation loss between a user and a radio base station apparatus, and interference imposed on peripheral cells, the radio base station apparatus is required to control transmission power of mobile terminal apparatuses so as to meet required reception quality. In the LTE systems, Factional transmission power control is adopted as the transmission power control method with consideration given to inter-cell interference.

More specifically, transmission power of signals (PUSCH (Physical Uplink Shared CHannel), PUCCH (Physical Uplink Control CHannel), SRS (Sounding Reference Signal)) and the like transmitted in uplink in the LTE systems is controlled by a combination of open-loop control by parameters ($P_0$, $\alpha$, etc.) notified by a radio base station apparatus at relatively long intervals and propagation loss (PL) measured by a mobile terminal apparatus, and closed-loop control by a TPC command notified by the radio base station apparatus at relatively short intervals based on communication conditions (for example, reception SINR (Signal to Interference plus Noise power Ratio) in the radio base station apparatus) between the radio base station apparatus and the mobile terminal apparatus. More specifically, transmission power of the PUSCH is given by following equation (1) (for example, see Non-patent Document 1).

$$P_{PUSCH}(i) = \min\{P_{CMAX}, 10 \log_{10}(M_{PUSCH}(i)) + P_{0\_PUSCH}(j) + \alpha(j) \cdot PL + \Delta_{TF}(i) + f(i)\} \quad \text{Eq. (1)}$$

Herein, $P_{CMAX}$ is maximum transmission power, $M_{PUSCH}$ is a transmission bandwidth, $P_{0\_PUSCH}$ is a parameter related to target reception power, $\alpha$ is a weighting factor of Fractional TPC, PL is a path loss measurement value, $\Delta_{TF}$ is an offset dependent on MCS, and $f(i)$ is a correction value by a TPC command.

In this Fractional transmission power control, target reception power is set (achieved by the parameter a of open-loop control) corresponding to the propagation loss (PL) in the mobile terminal apparatus, and it is thereby possible to reduce inter-cell interference.

Further, in closed-loop TPC performed between the radio base station apparatus and the mobile terminal apparatus, for example, the radio base station apparatus measures a difference between the reception SINR obtained by averaging for averaging time t and the target reception SINR, notifies the mobile terminal apparatus of the difference as a TPC command, and thus controls transmission power of the mobile terminal apparatus.

CITATION LIST

Non-Patent Literature

[Non-patent Literature 1] 3GPP, TS 36.213, V8.7.0, "Evolved Universal Terrestrial Radio Access (E-UTRA); Physical layer procedures"

SUMMARY OF THE INVENTION

Technical Problem

In addition, the 3GPP has studied successor systems (for example, LTE-Advanced (LTE-A)) to LTE for the purpose of further increasing the band and speed. In LTE-A, studied is application of carrier aggregation (CA) for broadening the band using a plurality of component carriers (CC). In this case, it is required to suitably control uplink transmission power for each component carrier.

For example, with introduction of carrier aggregation, a method is considered for setting an uplink transmission power control parameter (open-loop TPC parameter such as $P_{0\_PUSCH}$, closed-loop TPC parameter such as $f(i)$) for each of all a plurality of component carriers.

Generally, $f(i)$ that is a closed-loop TPC parameter is controlled by a TPC command transmitted by L1/L2 signaling. Further, the TPC command is transmitted by an UL scheduling grant (UL grant (DCI format0)) including uplink frequency scheduling information or a group TPC command (DCI format3/3A) with TPC commands of a plurality of UEs collected via a downlink control channel (PDCCH).

However, in the case of transmitting a TPC command applied to each component carrier using the UL grant (DCI format0 and DCI format4), it is not possible to transmit a TPC command by the UL grant for a component carrier that is not assigned to uplink transmission, and therefore, there is the risk that $f(i)$ is not set at a suitable value in Sounding RS in the component carrier, transmission of the first data after a transmission interval, and the like (see CC#2 in FIG. 14).

Meanwhile, in the case of transmitting a TPC command applied to each component carrier using the group TPC command (DCI format3/3A), there is a problem that L1/L2 signaling overhead increases in proportion to the number of component carriers. Further, since the group TPC command is collectively transmitted to a plurality of UEs, there is another problem that assignment flexibility is not obtained.

The present invention was made in view of such a respect, and it is an object of the invention to provide a transmission power control method, mobile terminal apparatus and radio base station apparatus for enabling a mobile terminal apparatus that performs radio communications in a system band including a plurality of component carriers to suitably control uplink transmission power in each component carrier.

Solution to Problem

A transmission power control method of the invention is a transmission power control method of controlling uplink transmission power of a mobile terminal apparatus that performs radio communications in a system band including a plurality of component carriers, and is characterized by having the steps of receiving a TPC command generated in a radio base station apparatus, and applying the received TPC command to a plurality of component carriers in common and setting transmission power of each of the component carriers.

According to the configuration, it is possible to apply a TPC command included in a UL grant (DCI format0 and DCI format4) for some CC or a group TPC command (DCI format3/3A) to all component carriers, and it is thereby possible to set f(i) on a component carrier that is not assigned to uplink transmission and suitably control transmission power.

A mobile terminal apparatus of the invention is a mobile terminal apparatus that performs radio communications in a system band including a plurality of component carriers, and is characterized by having a TPC command reception section that receives a TPC command generated in a radio base station apparatus, and a transmission power setting section that applies the TPC command received in the TPC command reception section to a plurality of component carriers in common and that sets transmission power of each of the component carriers.

A radio base station apparatus of the invention is characterized by having a target reception power generating section which measures a reception quality difference in each component carrier, generates target reception power specific to each component carrier with the reception quality difference considered to notify a mobile terminal apparatus that performs radio communications in a system band including a plurality of component carriers, and a TPC command generating section that generates a TPC command associated with each of the plurality of the component carriers to notify the mobile terminal apparatus.

Technical Advantage of the Invention

According to the present invention, in a mobile terminal apparatus that performs radio communications in a system band including a plurality of component carriers, it is possible to suitably control uplink transmission power of each component carrier.

BRIEF DESCRIPTION OF THE DRAWINGS

FIG. 2 contains diagrams showing an example of a hierarchical bandwidth configuration defined in LTE-A;

DESCRIPTION OF EMBODIMENTS

An Embodiment of the present invention will specifically be described below with reference to accompanying drawings. In addition, this Embodiment describes an example of applying the invention to LTE-Advanced, but the invention is not limited to the case of applying to LTE-Advanced.

In a communication system to which the invention is applied, performed is carrier aggregation for adding or removing a plurality of component carriers to constitute a system band. Carrier aggregation will be described first with reference to FIG. 1.

Figure 1:
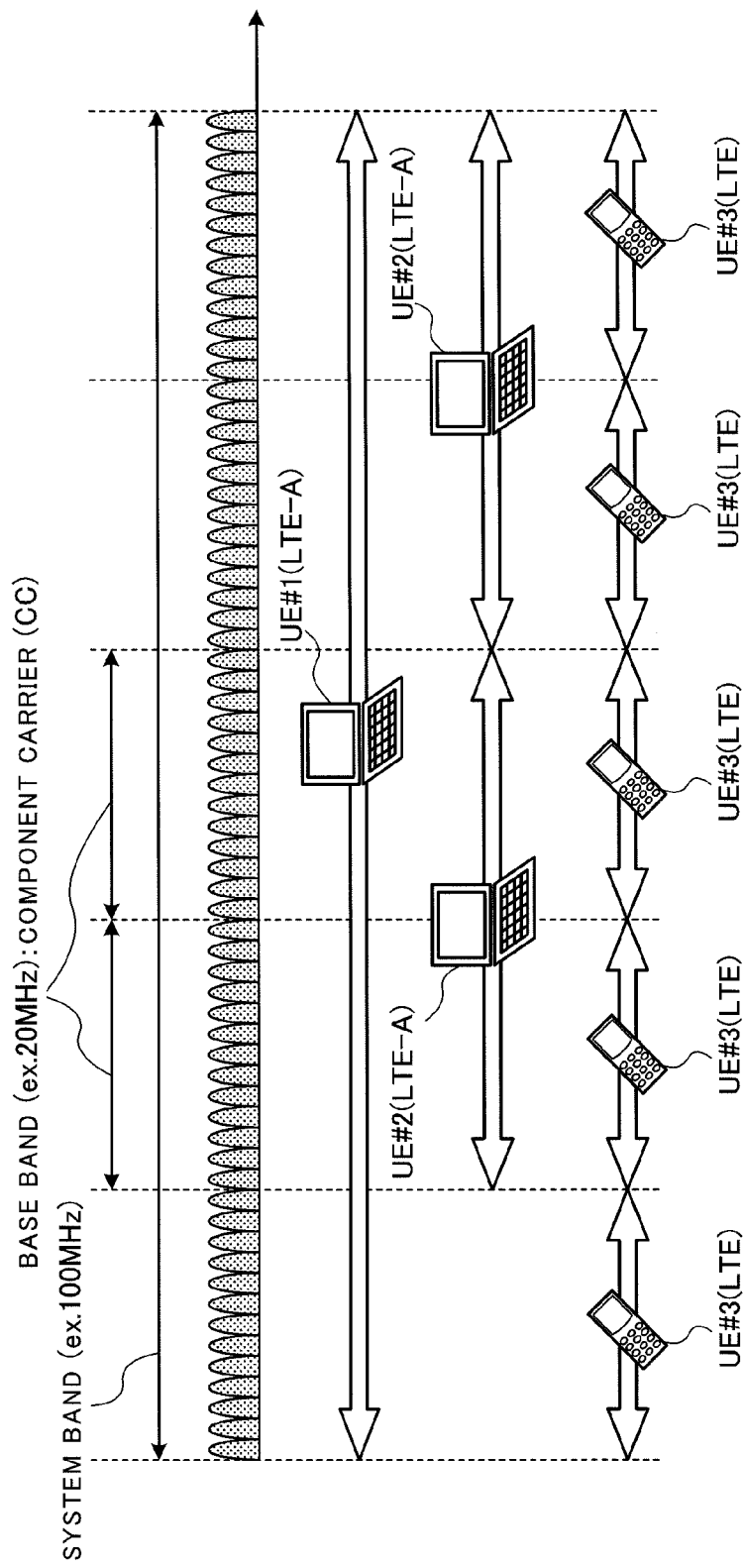
FIG. 1 is a diagram showing an example of a hierarchical bandwidth configuration defined in LTE-A.

FIG. 1 is a diagram showing an example of a hierarchical bandwidth configuration agreed in LTE-A. The example as shown in FIG. 1 is of a hierarchical bandwidth configuration of the case of coexistence of LTE-A systems that are first communication systems having first system bands comprised of a plurality of component carriers (CCs), and LTE systems that are second mobile communication systems having a second system band comprised of one component carrier. In the LTE-A systems, for example, radio communications are performed with variable system bandwidths of maximum 100 MHz, and in the LTE systems, radio communications are performed with variable system bandwidths of maximum 20 MHz. The system band of the LTE-A system includes at least one component carrier with the system band of the LTE system as a unit, and the number of component carriers is added or decreased dynamically or quasi-statically. Thus broadening the band using a plurality of component carriers is called carrier aggregation.

For example, in FIG. 1, the system band of the LTE-A system is the system band (20 MHz×5=100 MHz) containing bands of five component carriers where one component carrier is the system band (base band: 20 MHz) of the LTE system. In FIG. 1, a mobile terminal UE (User Equipment) #1 is a user terminal which supports the LTE-A system (also supports the LTE system), and is capable of supporting the system band up to 100 MHz. A UE #2 is a user terminal that supports the LTE-A system (also supports the LTE system), and is capable of supporting the system band up to 40 MHz (20 MHz×2=40 MHz). A UE #3 is a user terminal that supports the LTE system (does not support the LTE-A system), and is capable of supporting the system band up to 20 MHz (base band).

Further, as shown in FIG. 2, carrier aggregation is actualized within the same frequency band (Intra-band) (see FIG.

2A) and between different frequency bands (Inter-band) (see FIG. 2B). As the different frequency bands, for example, it is possible to configure the system band by combining component carriers respectively with the band of 800 MHz and the band of 2 GHz.

With introduction of carrier aggregation, it is required to control uplink transmission power suitably for each component carrier, but as described previously, in the method of setting a TPC command individually for each of a plurality of component carriers, it is difficult to set uplink transmission power control suitably for each component carrier.

Therefore, as a result of studying the method of controlling uplink transmission power suitably in each component carrier of a mobile terminal apparatus, the inventor of the invention focused on the respect of applying a TPC command to at least a part of a plurality of component carriers in common, and controlling transmission power of each component carrier using f(i) as an each component carrier common parameter, and arrived at the invention.

Hereinafter, described specifically is transmission power control for controlling uplink transmission power suitably in a mobile terminal apparatus that performs radio communications in a system band including a plurality of component carriers.

(First Transmission Power Control)

Figure 3:
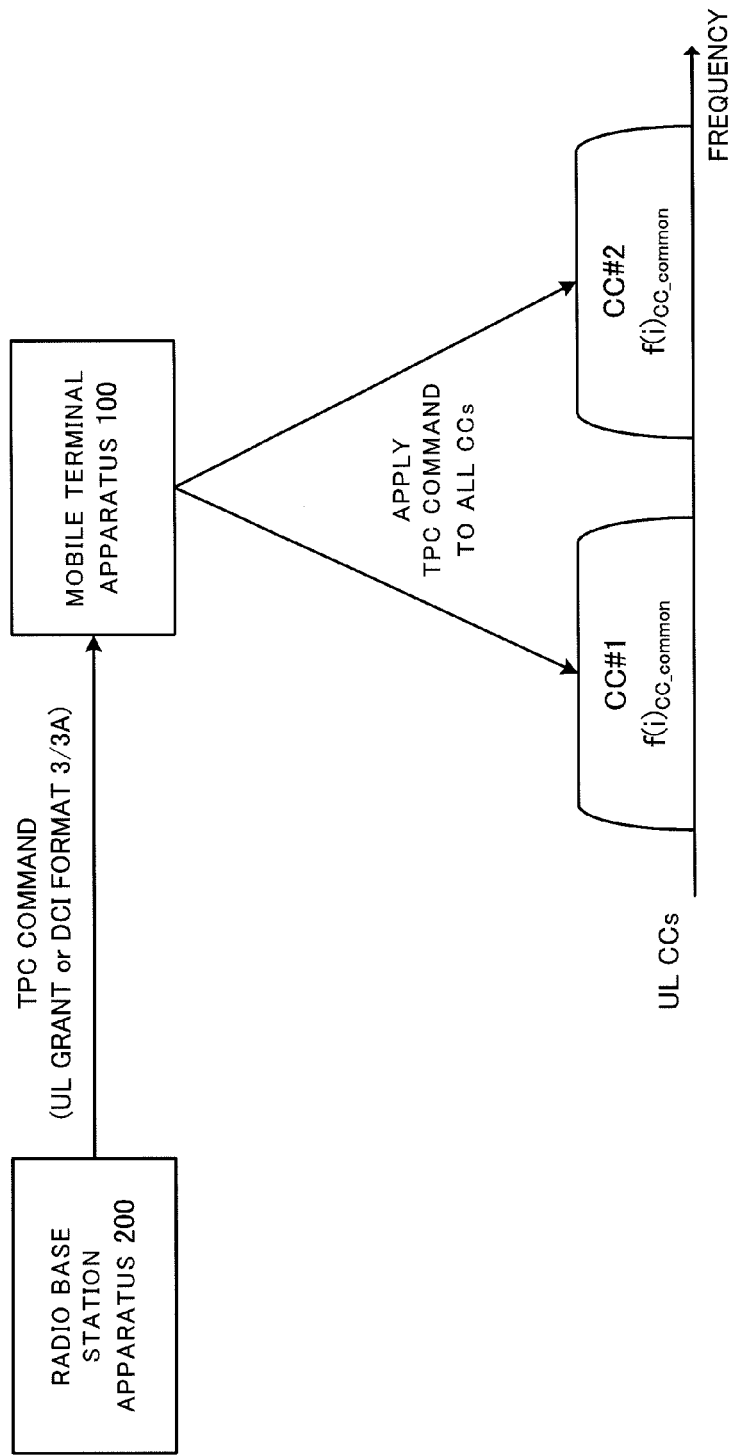
FIG. 3 is a diagram to explain first transmission power control according to an Embodiment of the invention.

FIG. 3 shows a schematic diagram in the case of applying first transmission power control shown in this Embodiment. A mobile terminal apparatus 100 is to perform radio communications in a system band including a plurality of component carriers (herein, CC #1, CC #2), and has a configuration capable of receiving a downlink signal and transmitting an uplink signal from/to a radio base station apparatus 200 for each component. The radio base station apparatus 200 measures a reception SINR (Signal to Interference plus Noise Ratio) of the mobile terminal apparatus 100 using an uplink sounding reference signal (SRS: Sounding Reference Signal) received from the mobile terminal apparatus 100, and is capable of generating a TPC command of each component carrier from a difference between the reception SINR and a beforehand set target reception SINR. The TPC command generated in the radio base station apparatus 200 is notified to the mobile terminal apparatus 100 on a PDCCH (Physical Downlink Control CHannel), and transmission power of the mobile terminal apparatus 100 is controlled.

In first transmission power control shown in this Embodiment, the mobile terminal apparatus 100, which performs radio communications in a system band including a plurality of component carriers, is notified of a TPC command generated in the radio base station apparatus 200, applies the received TPC command associated with a predetermined component carrier to a plurality of component carriers in common, and sets transmission power of each component carrier. It is possible to apply above-mentioned equation (1) to setting of transmission power of each component carrier in the mobile terminal apparatus 100.

In other words, in first transmission power control of this Embodiment, instead of applying a received TPC command only to a component carrier associated with the TPC command to set f(i), the same TPC command is applied to a plurality of component carriers in common to set f(i), and transmission power of each component carrier is set using above-mentioned equation (1). Therefore, for the component carrier associated with the applied TPC command among a plurality of component carriers, f(i) is set as in the conventional case to determine transmission power. In contrast thereto, for the other component carriers, since the TPC command associated with the different component carrier is applied, there is a configuration that f(i) different from the conventional value is set in common to determine transmission power.

By applying first transmission power control of this Embodiment, since it is possible to make the configuration for applying a TPC command included in a UL grant (DCI format0 and DCI format4) or a group TPC command (DCI format3/3A) to all component carriers, it is possible to set f(i) in a component carrier that is not assigned to uplink transmission and suitably control transmission power. Further, it is essential only to transmit the UL grant (DCI format0 and DCI format4) (without necessarily transmitting a group TPC command (DCI format3/3A)), and it is thereby possible to reduce L1/L2 signaling overhead.

Further, in first transmission power control, it is preferable that the radio base station apparatus 200 measures reception quality differences between a plurality of component carriers, and notifies the mobile terminal apparatus 200 of offset information for compensating for the reception quality differences, and that transmission power is determined in consideration of the offset information in setting transmission power of each component carrier. For example, using an uplink sounding reference signal (SRS) of the mobile terminal apparatus 100, the radio base station apparatus 200 measures an uplink reception level for each component carrier of the mobile terminal apparatus 100, and is thereby capable of obtaining the reception quality difference.

By this means, in the case that frequency characteristics are different between a plurality of component carriers (carrier aggregation of different frequency bands (Inter-band CA)), even when the same TPC command is applied to a plurality of component carriers, it is possible to set transmission power suitably.

The offset information is capable of being a target reception power (CC-Specific $P_{0\_PUSCH}$ specific to each component carrier with consideration given to the reception quality difference between component carriers. In this case, the offset information to compensate for the reception quality difference measured in the radio base station apparatus 200 is applied to an open-loop TPC parameter.

Figure 4:
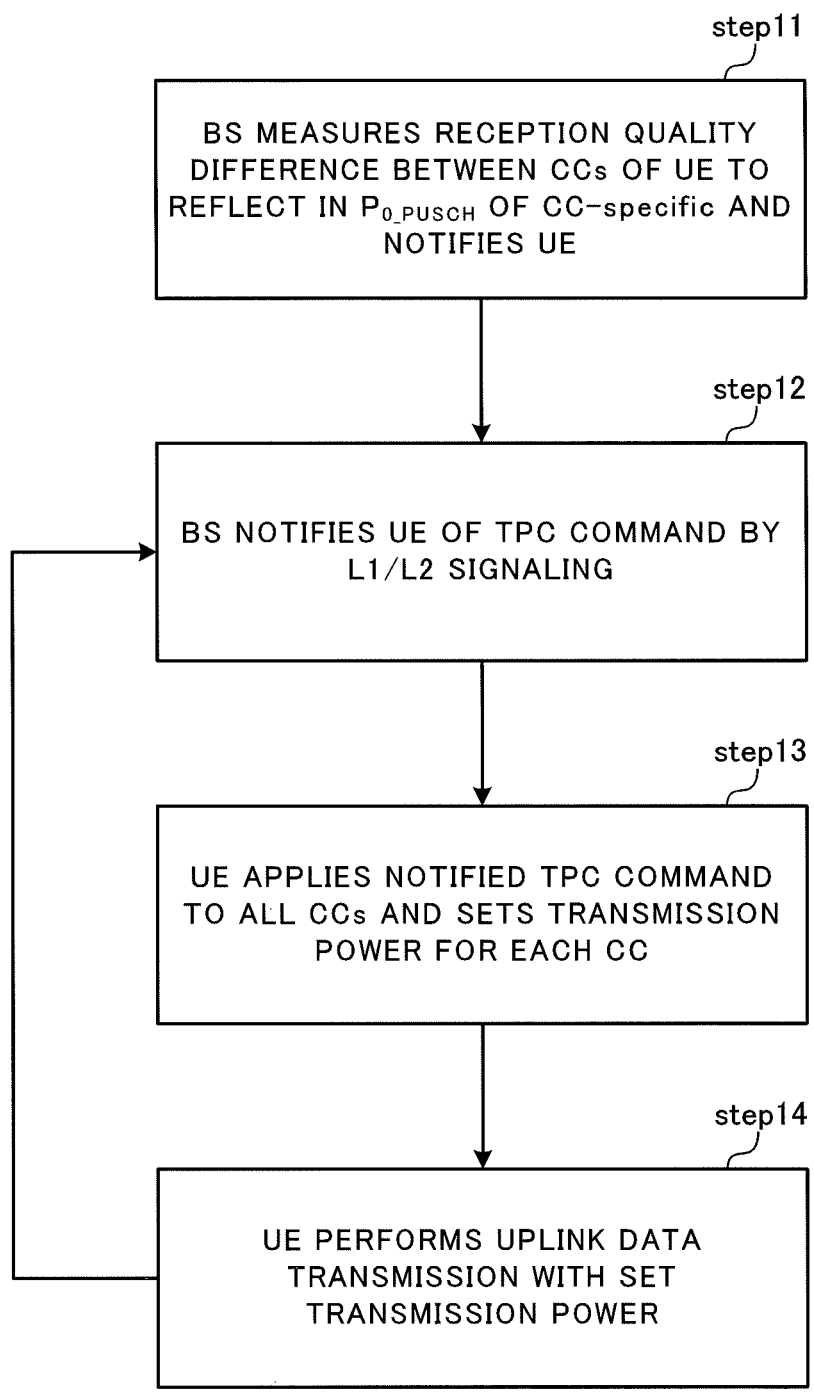
FIG. 4 is a flow diagram to explain first transmission power control according to the Embodiment of the invention.

Specific procedures of first transmission power control will be described below with reference to FIG. 4.

First, the radio base station apparatus 200 measures a reception quality difference between component carriers of the mobile terminal apparatus 100 to which radio resources are allocated, and applies the reception quality difference to respective target reception power ($P_{0\_PUSCH}$) of the open-loop TPC parameter of each component carrier to notify the mobile terminal apparatus 100 (step 11).

Next, the radio base station apparatus 200 notifies the mobile terminal apparatus 100 of the TPC command by L1/L2 signaling (step 12).

After receiving the TPC command notified from the radio base station apparatus 200, the mobile terminal apparatus 100 applies the TPC command to all component carriers, and sets transmission power of each component carrier (step 13). Next, the mobile terminal apparatus 100 performs uplink data transmission of allocated resources with the set transmission power (step 14).

In notification of the TPC command to the mobile terminal apparatus 100 in step 12, the TPC command is capable of being transmitted on the PDCCH (UL grant (DCI format0 and DCI format4) or group TPC command (DCI format3/3A)), and by transmitting by the UL grant (DCI format0 and DCI format4), it is possible to reduce L1/L2 signaling overhead. Further, in setting transmission power of each component carrier in step 13, by determining transmission power in consideration of information on target reception power ($P_{0\_PUSCH}$) notified in step 11, also in the case that frequency characteristics are different between a plurality of component carriers (different frequency bands (Inter-band CA)), it is possible to set transmission power suitably.

Described below are configurations of the mobile terminal apparatus, radio base station apparatus and the like to which first transmission power control is applied. Described herein is the case of using the radio base station apparatus and mobile terminal apparatus that support systems of LTE-A scheme (LTE-A systems).

Figure 5:
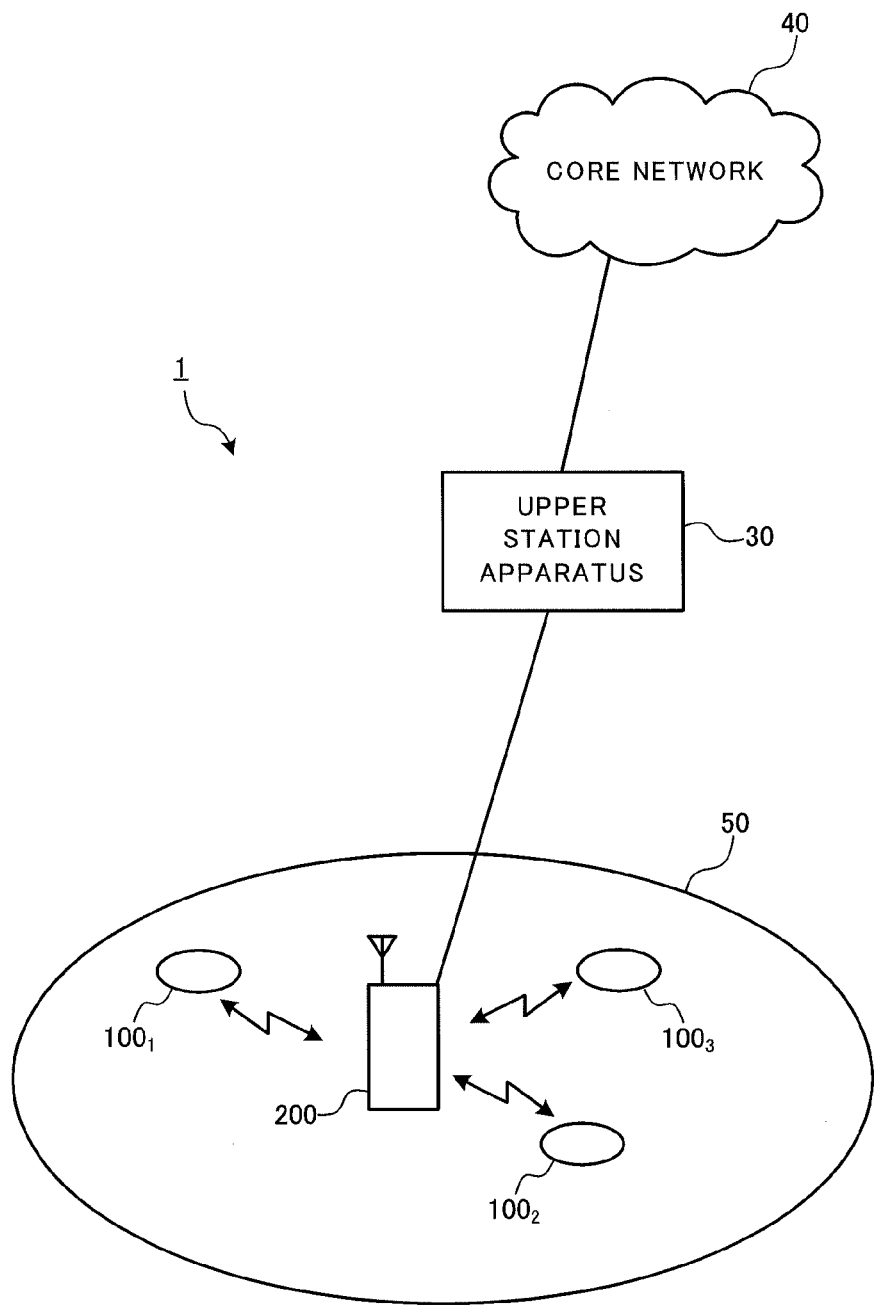
FIG. 5 is a diagram to explain a configuration of a mobile communication system according to the Embodiment of the invention.

First, referring to FIG. 5, described is a mobile communication system 1 having mobile terminal apparatuses 100 and radio base station apparatus 200. FIG. 5 is a diagram to explain a configuration of the mobile communication system 1 having the mobile terminal apparatuses 100 and radio base station apparatus 200 according to one Embodiment of the invention. In addition, the mobile communication system 1 as shown in FIG. 5 is a system including the LTE system or SUPER 3G, for example. Further, the mobile communication system 1 may be called IMT-Advanced or may be called 4G.

As shown in FIG. 5, the mobile communication system 1 includes the radio base station apparatus 200 and a plurality of mobile terminal apparatuses 100 ($100_1, 100_2, 100_3, \ldots, 100_n$, n is an integer where n>0) that communicate with the radio base station apparatus 200 and is comprised thereof. The radio base station apparatus 20 is connected to an upper station apparatus 30, and the upper station apparatus 30 is connected to a core network 40. The mobile terminal apparatus 100 communicates with the radio base station apparatus 200 in a cell 50. In addition, for example, the upper station apparatus 30 includes an access gateway apparatus, radio network controller (RNC), mobility management entity (MME), etc., but is not limited thereto.

In the mobile communication system 1, as a radio access scheme, OFDMA (Orthogonal Frequency Division Multiple Access) is applied in downlink, while SC-FDMA (Single-Carrier Frequency Division Multiple Access) or Clustered DFT-Spread OFDM is applied in uplink.

OFDMA is a multicarrier transmission scheme for dividing a frequency band into a plurality of narrow frequency bands (subcarriers), and mapping data to each subcarrier to perform communications. SC-FDMA is a single-carrier transmission scheme for dividing the system band into bands comprised of a single or consecutive resource blocks for each terminal so that a plurality of terminals uses mutually different bands, and thereby reducing interference among the terminals. Clustered DFT-Spread OFDM is a scheme for assigning a group (cluster) of non-consecutive clustered subcarriers to a single mobile terminal UE, applying discrete Fourier transform spreading OFDM to each cluster, and thereby actualizing uplink multiple access.

Described herein are communication channels in the LTE system. In downlink are used the PDSCH shared among the mobile terminal apparatuses 100, and downlink L1/L2 control channels (PDCCH, PCFICH, PHICH). User data, i.e. normal data signals are transmitted on the PDSCH. The transmission data is included in the user data. In addition, the UL scheduling grant (UL grant) including a transmission identification bit is notified to the mobile terminal apparatus 100 on the L1/L2 control channel (PDCCH).

In uplink are used the PUSCH shared among the mobile terminal apparatuses 100 and the PUCCH that is an uplink control channel. User data is transmitted on the PUSCH. Further, downlink radio quality information (CQI: Channel Quality Indicator) and the like are transmitted on the PUCCH.

Figure 6:
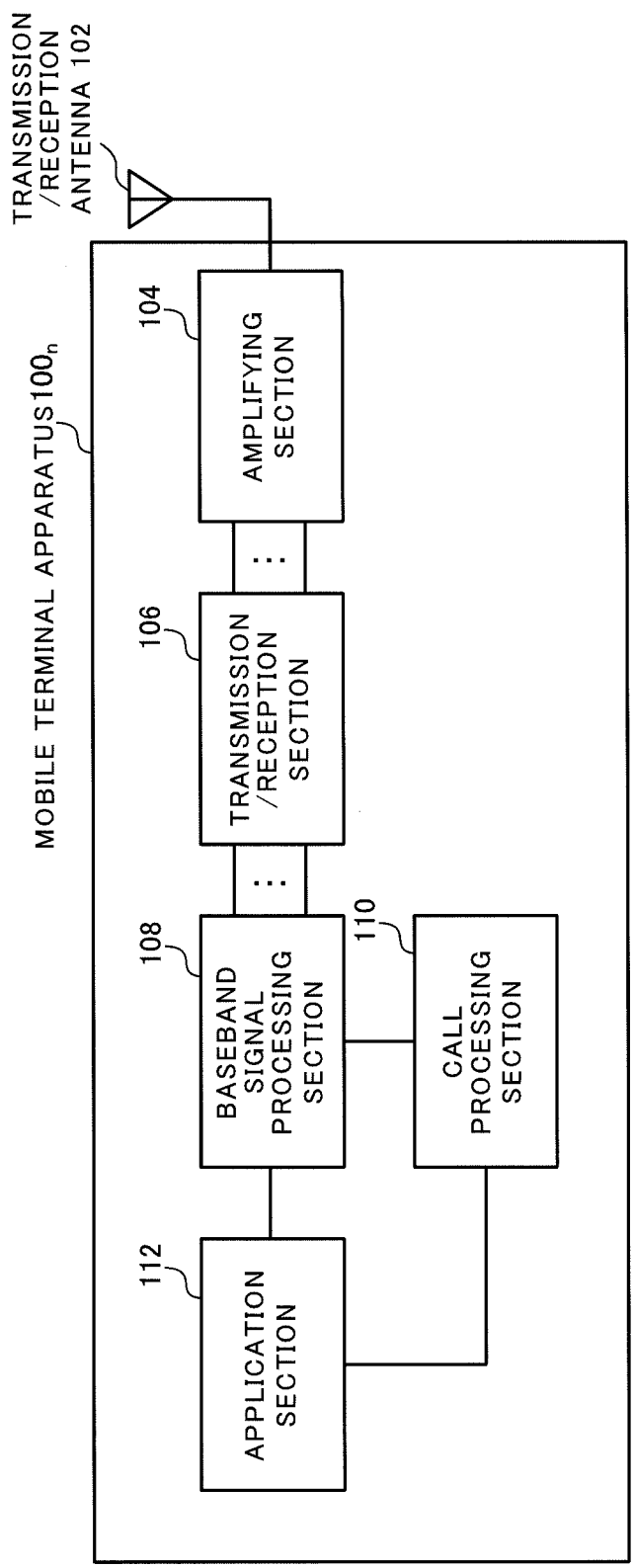
FIG. 6 is a block diagram illustrating an entire configuration of a mobile terminal apparatus according to the Embodiment of the invention.

A functional configuration of the mobile terminal apparatus will be described next with reference to FIG. 6. FIG. 6 is an example of a functional block diagram of the mobile terminal apparatus to which first transmission power control is applied.

As shown in FIG. FIG. 6, the mobile terminal apparatus 100, is provided with a transmission/reception antenna 102, amplifying section 104 associated with the transmission/reception antenna 102, transmission/reception section 106, baseband signal processing section 108, call processing section 110 and application section 112 and is comprised thereof.

Uplink data is input to the baseband signal processing section 108 from the application section 112. The baseband signal processing section 108 performs processing of retransmission control (H-ARQ (Hybrid ARQ)), scheduling, transmission format selection, channel coding, transmission power setting etc. on the data to transfer to the transmission/reception section 106 for each antenna. The transmission/reception section 106 frequency-converts the baseband signal output from the baseband signal processing section 108 into a radio-frequency signal for each antenna. The signal subjected to frequency conversion is then amplified in the amplifying section 104, and is transmitted from the transmission/reception antenna 102 for each antenna.

With respect to data in downlink, a radio frequency signal received in the transmission/reception antenna 102 is amplified in the amplifying section 104 so as to correct reception power to certain power under AGC (Auto Gain Control). The amplified radio-frequency signal is frequency-converted into a baseband signal in the transmission/reception section 106. The baseband signal is subjected to predetermined processing (error correction, decoding, etc.) in the baseband signal processing section 108, and then, is transferred to the call processing section 110 and the application section 112. The call processing section 110 performs management of communications with the radio base station apparatus and the like, and the application section 112 performs processing concerning layers higher than the physical layer and MAC layer and the like.

Figure 7:
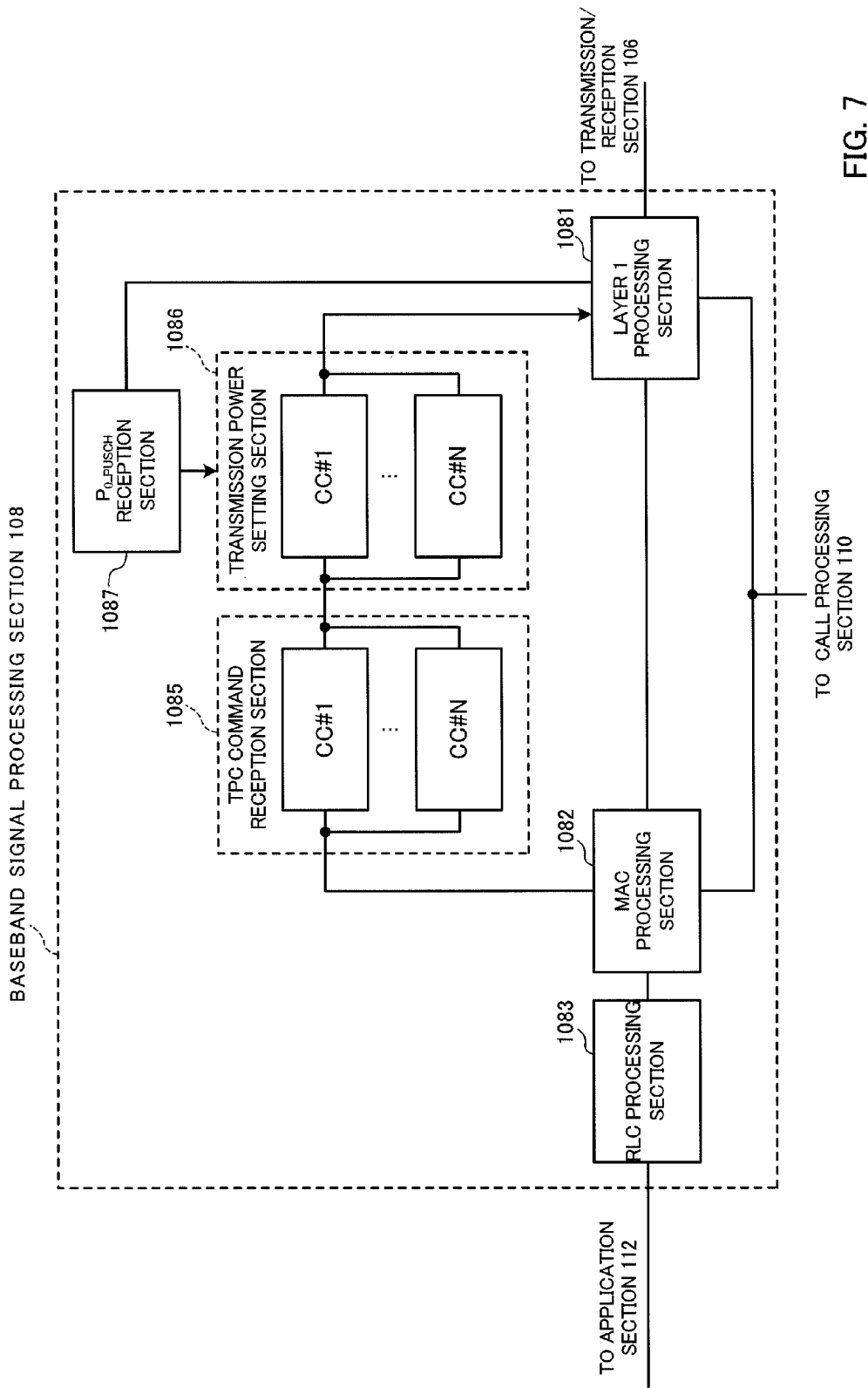
FIG. 7 is a diagram showing an example of a functional block diagram of a baseband signal processing section that the mobile terminal apparatus has according to the Embodiment of the invention.

Next, referring to FIG. 7, described is a functional configuration of the baseband processing section of the mobile terminal apparatus as shown in FIG. 6.

The baseband signal processing section 108 has a layer 1 processing section 1081, MAC processing section 1082, RLC processing section 1083, TPC command reception section 1085, and transmission power setting section 1086. Further, in setting transmission power of each component carrier, when it is configured to consider the offset information for compensating for the reception quality difference between a plurality of component carriers to determine, it is possible to make a configuration provided with a target reception power ($P_{0\_PUSCH}$) reception section 1087.

The layer 1 processing section 1081 mainly performs processing concerning the physical layer. The layer 1 processing section 1081 performs, on a signal received in downlink, processing such as, for example, channel decoding, discrete Fourier transform (DFT) frequency demapping, inverse Fourier transform (IFFT), and data demodulation. Further, the section 1081 performs, on a signal to transmit in uplink, processing such as channel coding, data modulation, frequency mapping and inverse Fourier transform (IFFT).

The MAC processing section 1082 performs retransmission control (HARQ) in the MAC layer on the signal received in downlink, the analysis (identification of a transmission format of the PDSCH, and identification of a resource block of the PDSCH) of scheduling information for downlink, and the like. Further, the MAC processing section 1082 performs MAC retransmission control on the signal to transmit in uplink, the analysis (identification of a transmission format of the PUSCH, and identification of a resource block of the PUSCH) of uplink scheduling information, and the like.

The RLC processing section 1083 performs packet segmentation and packet concatenation on packets received in uplink and packets received from the application section 112 to transmit in downlink, retransmission control in the RLC layer, and the like.

The $P_{0\_PUSCH}$ reception section 1087 receives information on target reception power (CC-Specific $P_{0\_PUSCH}$) specific to each component carrier with consideration given to the reception quality difference between a plurality of component carriers.

The TPC command reception section 1085 receives the TPC command associated with a plurality of component carriers to apply to the transmission power setting section 1086.

The transmission power setting section 1086 applies the TPC command received in the TPC command reception section 1085 to a plurality of component carriers in common to define f(i), and sets transmission power of each component carrier using above-mentioned equation (1). Further, when the $P_{0\_PUSCH}$ reception section 1087 is provided, the section 1086 applies the target reception power specific to each component carrier received in the $P_{0\_PUSCH}$ reception section 1087 to open-loop TPC, and sets transmission power of each component carrier.

In other words, in first transmission power control, for one component carrier (component carrier associated with the TPC command used in common) among a plurality of component carriers, transmission power is set by above-mentioned equation (1) using a correction value f(i) obtained from the TPC command determined corresponding to a communication environment between the base station apparatus and the mobile terminal apparatus. Meanwhile, for the other component carriers, transmission power is set by above-mentioned equation (1) using the correction value f(i) obtained from the TPC command that is not determined directly corresponding to a communication environment between the base station apparatus and the mobile terminal apparatus. Thus, in first transmission power control, as distinct from the conventional case, since f(i) that is a closed-loop TPC parameter is set in each component carrier in common to determine transmission power, used is the correction value f(i) obtained from the TPC command that is not determined directly corresponding to the communication environment between the base station apparatus and the mobile terminal apparatus. In this case, when frequency characteristics are different in each component carrier, by applying the offset information for compensating for the reception quality difference to an open-loop TPC parameter in above-mentioned equation (1), it is possible to suitably adjust transmission power in each component carrier.

In this Embodiment, it is essential only to apply the TPC command received in the TPC command reception section 1085 to a plurality of component carriers in common, and the TPC command to apply is capable of being set as appropriate.

For example, when the TPC command reception section 1085 receives a TPC command specific to each component carrier set for each of a plurality of component carriers, a TPC command associated with a particular component carrier is applied to a plurality of component carriers in common, and transmission power of each component carrier is set. In this case, it is possible to make a configuration that whenever receiving a TPC command specific to each component carrier, the received TPC is applied to a plurality of component carriers in common to set transmission power as appropriate.

Moreover, such a configuration may be made that a TPC command associated with a particular component carrier is selected from among TPC commands of a plurality of component carriers, and is applied to a plurality of component carriers in common to set transmission power.

Further, instead of using a TPC command of an individual component carrier to a plurality of component carriers, a TPC command used in a plurality of component carriers in common may be set separately. In this case, the TPC command reception section 1085 receives a TPC command used in a plurality of component carriers in common, the TPC command used in common is applied to a plurality of component carriers in common, and transmission power of each component carrier is set.

Figure 8:
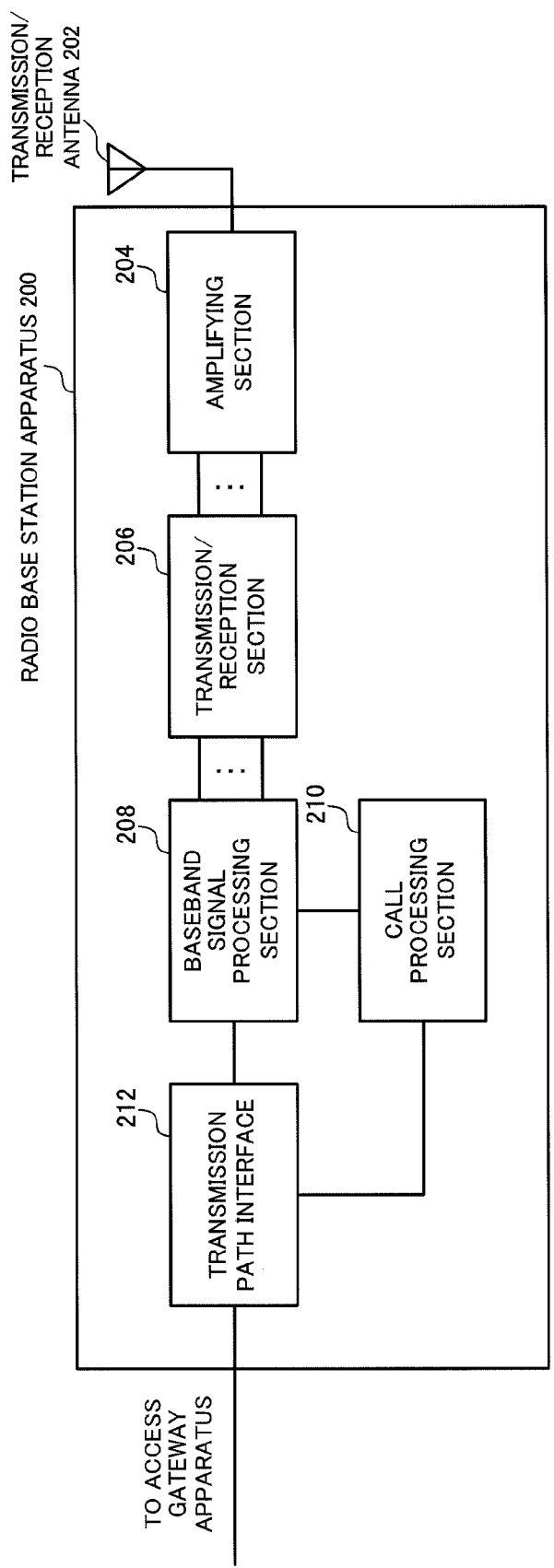
FIG. 8 is a block diagram illustrating an entire configuration of a radio base station apparatus according to the Embodiment of the invention.

A functional configuration of the radio base station apparatus will be described next with reference to FIG. 8. FIG. 8 is an example of a functional block diagram of the radio base station apparatus to which first transmission power control is applied.

As shown in FIG. 8, the radio base station apparatus 200 is provided with a transmission/reception antenna 202, amplifying section 204, transmission/reception section 206, baseband signal processing section 208, call processing section 210 and transmission path interface 212 and is comprised thereof. The apparatus 200 may have a plurality of transmission/reception antennas 202.

With respect to uplink data, a radio frequency signal received in the transmission/reception antenna 202 is amplified in the amplifying section 204 so that reception power is corrected to certain power under AGC. The amplified radio frequency signal is frequency-converted into a baseband signal in the transmission/reception section 206. The baseband signal is subjected to predetermined processing (error correction, decoding, etc.) in the baseband signal processing section 208, and then, is transferred to the access gateway apparatus, not shown, via the transmission path interface 212. The access gateway apparatus is connected to the core network, and manages each mobile terminal.

With respect to downlink data, the upper apparatus inputs the data to the baseband signal processing section 208 via the transmission path interface 212. The baseband signal processing section 208 performs processing of retransmission control (H-ARQ (Hybrid ARQ)), scheduling, transmission format selection, channel coding and the like on the data to transfer to the transmission/reception section 206. The transmission/reception section 206 frequency-converts the baseband signal output from the baseband signal processing section 208 into a radio frequency signal. The frequency-converted signal is then amplified in the amplifying section 204, and is transmitted from the transmission/reception antenna 202.

The call processing section 210 transmits and receives call processing control signals to/from a radio control station that is the upper apparatus, and performs status management of the radio base station apparatus 200 and resource allocation. In addition, the processing in a layer 1 processing section 2081 and MAC processing section 2082 is set based on communication conditions between the radio base station apparatus 200 and the mobile terminal apparatus $100_n$ set in the call processing section 210.

Figure 9:
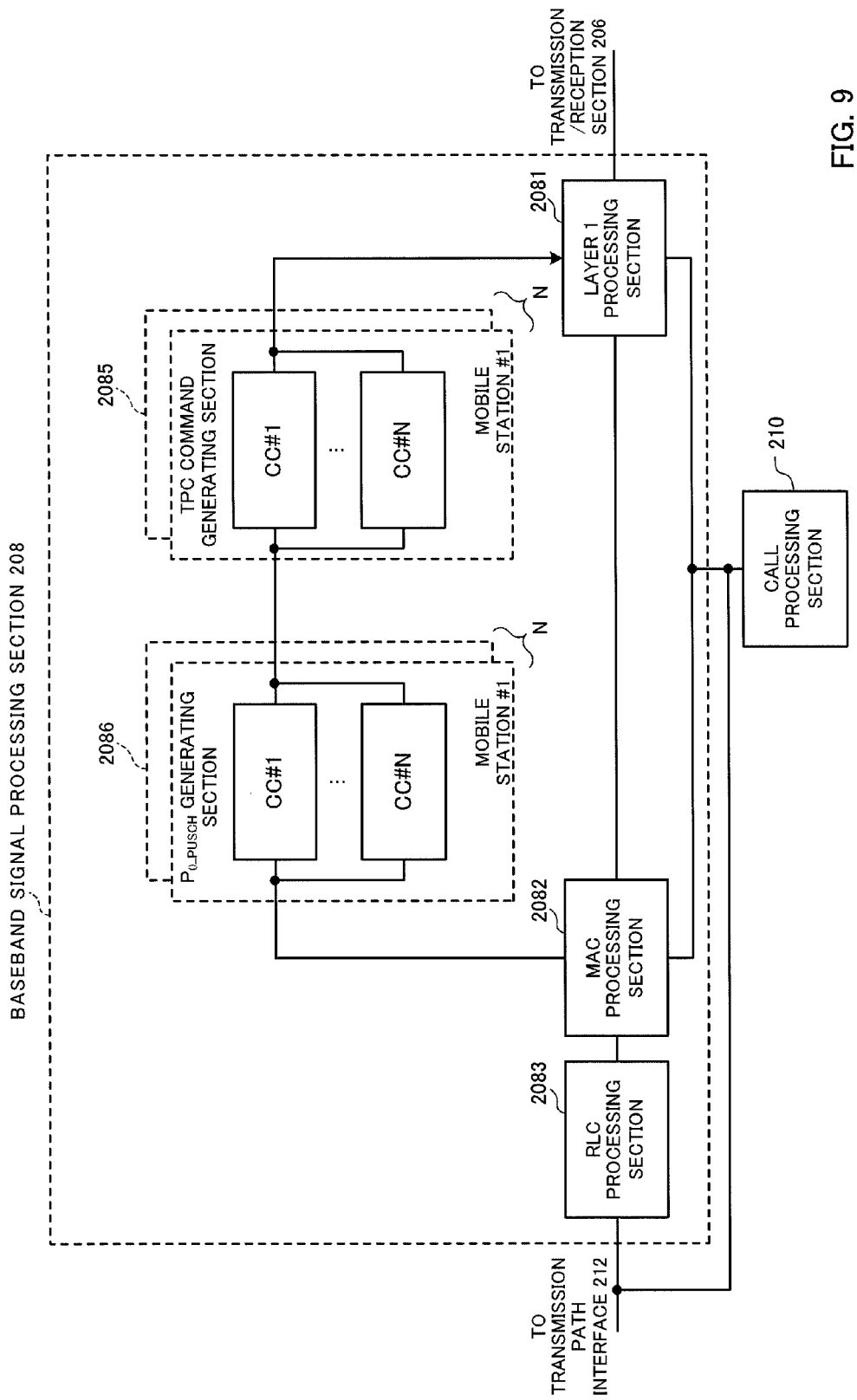
FIG. 9 is a diagram showing an example of a functional block diagram of a baseband signal processing section that the radio base station apparatus has according to the Embodiment of the invention.

Next, referring to FIG. 9, described is a functional configuration of the baseband signal processing section. FIG. 9 is a functional block diagram of the baseband signal processing section of the radio base station apparatus.

As shown in FIG. 9, the baseband signal processing section 208 has the layer 1 processing section 2081, MAC (Medium Access Control) processing section 2082, RLC processing section 2083, TPC command generating section 2085, and target reception power ($P_{0\_PUSCH}$) generating section 2086.

The layer 1 processing section 2081 mainly performs processing concerning the physical layer. The layer 1 processing section 2081 performs, on a signal received in uplink, processing such as, for example, channel decoding, discrete Fourier transform (DFT), frequency demapping, inverse Fourier transform (IFFT), and data demodulation. Further, the section 2081 performs, on a signal to transmit in downlink, processing such as channel coding, data modulation, frequency mapping and inverse Fourier transform (IFFT).

The MAC processing section 2082 performs processing such as retransmission control (HARQ) in the MAC layer on the signal received in uplink, scheduling for uplink and downlink, selection of transmission format of PUSCH/PDSCH, and selection of resource blocks of PUSCH/PDSCH.

The RLC processing section 2083 performs packet segmentation and packet concatenation on packets received in uplink and packets to transmit in downlink, retransmission control in the RLC layer, and the like.

The TPC command generating section 2085 generates a TPC command associated with each component carrier for each mobile terminal apparatus n or all mobile terminal apparatuses in common.

The $P_{0\_PUSCH}$ generating section 2086 measures reception quality differences between a plurality of component carriers, and generates target reception power (CC-Specific $P_{0\text{-}PUSCH}$) specific to each component carrier with consideration given to the reception quality difference to notify the mobile terminal apparatus.

Hereinafter, described specifically is a transmission power control method using the mobile terminal apparatus and radio base station apparatus to which is applied first transmission power control.

First, in the $P_{0\_PUSCH}$ generating section 2086, the base station apparatus measures reception quality differences between a plurality of component carriers, and generates target reception power (CC-Specific $P_{0\text{-}PUSCH}$) specific to each component carrier with consideration given to the reception quality difference to notify the mobile terminal apparatus. In the $P_{0\_PUSCH}$ reception section 1087, the mobile terminal apparatus receives information on target reception power (CC-Specific $P_{0\text{-}PUSCH}$) specific to each component carrier notified from the base station apparatus.

Next, the base station apparatus generates a TPC command associated with each component carrier in the TPC command generating section 2085 to notify the mobile terminal apparatus. After receiving the TPC command generated in the radio base station apparatus in the TPC command reception section 1085, the mobile terminal apparatus applies the TPC command to the transmission power setting section 1086. Then, in the transmission power setting section 1086, the mobile terminal apparatus applies the TPC command received in the TPC command reception section 1085 to a plurality of component carriers in common, and sets transmission power of each component carrier.

Thus, according the first transmission power control method according to this Embodiment, since it is possible to make the configuration for applying a TPC command included in the UL grant (DCI format0 and DCI format4) in any one of component carriers or a group TPC command (DCI format3/3A) to all component carriers, it is possible to set f(i) in a component carrier that is not assigned to uplink transmission and suitably control transmission power. Further, it is essential only to transmit the UL grant (DCI format0) (without necessarily transmitting a group TPC command (DCI format3/3A)), and it is thereby possible to reduce L1/L2 signaling overhead.

Described next is transmission power control different from above-mentioned first transmission power control. In addition, in the following descriptions, portions different from above-mentioned first transmission power control are focused to describe, and specific descriptions related to similar portions are omitted.

(Second Transmission Power Control)

Figure 10:
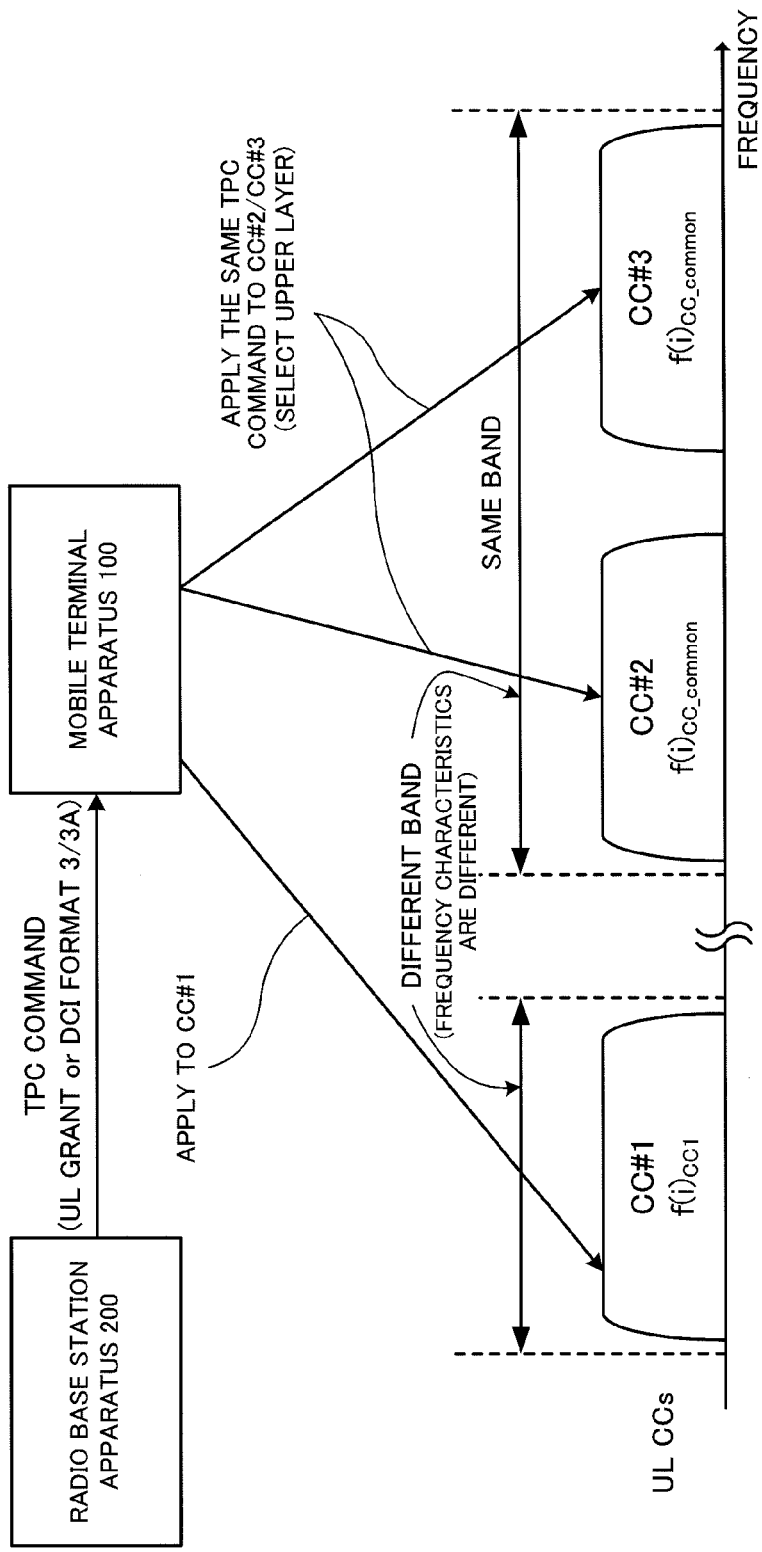
FIG. 10 is a diagram to explain second transmission power control according to the Embodiment of the invention.

FIG. 10 shows a schematic diagram in the case of applying second transmission power control shown in this Embodiment. In second transmission power control shown in this Embodiment, a particular component carrier group to apply a TPC command in common is selected from among a plurality of component carriers to notify the mobile terminal apparatus 100, and the apparatus 100 sets transmission power of each component carrier.

In other words, in second transmission power control in this Embodiment, a TPC command is applied to a particular component carrier group in common, TPC commands associated with respective component carriers are applied to the other component carriers respectively, and transmission power of each component carrier is set. For example, among a plurality of component carriers, a TPC command is applied to component carriers with the same or close frequency characteristics in common, and TPC commands associated with respective component carriers are applied to the component carriers with different frequency characteristics.

By this means, it is possible to control by relatively low L1/L2 signaling overhead, while setting transmission power with TPC commands with consideration given to differences in frequency characteristics between a plurality of component carriers.

With respect to frequency characteristics of component carriers, for example, it is possible to determine using frequency selective fading as a criterion. In this case, frequency characteristics being the same or close enable the effect of frequency selective fading in a component carrier to compare to be regarded as being almost equal, and represent the degree of permitting control using the same TPC command. When frequency characteristics are different, the effect of frequency selective fading in a component carrier to compare is different, and the case that control using the same TPC command cannot be permitted is indicated. Moreover, settings may be made in a fixed manner so as to always apply a common TPC command to component carriers within the same frequency band (Intra-band) while regarding frequency characteristics as being the same and to apply individual TPC commands to component carriers in different frequency bands (Inter-band) while regarding frequency characteristics as being different.

For the information on a particular component carrier to which the TPC command is applied in common, for example, it is possible to make a configuration in which the radio base station apparatus 200 notifies the mobile terminal apparatus 100 using higher layer signaling (RRC signaling), for example. By this means, it is possible to make a configuration for switching in the higher layer between an individual control mode for applying a TPC command only to an associated component carrier to make f(i) a parameter specific to the component carrier, and a common control mode for applying a TPC command in common to make f(i) a parameter common to a particular component carrier group. In addition, for example, in the case that the number of component carriers is "3" or more and is thus high, a component carrier individually controlled and a component carrier controlled in common may coexist. In addition, for RRC signaling, for example, 1-bit signaling may be used to only switch between individual and common to all component carriers, or multi-bit-signaling may be used to enable combinations of component carriers to apply a common control mode to be designated finely. Further, in the case of the group TPC command (DCI format3/3A), component carriers to apply a TPC command may be set in performing RRC configure with the need of particular signaling eliminated.

Further, in second transmission power control, as a method of selecting a particular component carrier group, selection may be performed for each mobile terminal apparatus 100 independently, or may be common to all mobile terminal apparatuses 100.

Figure 11:
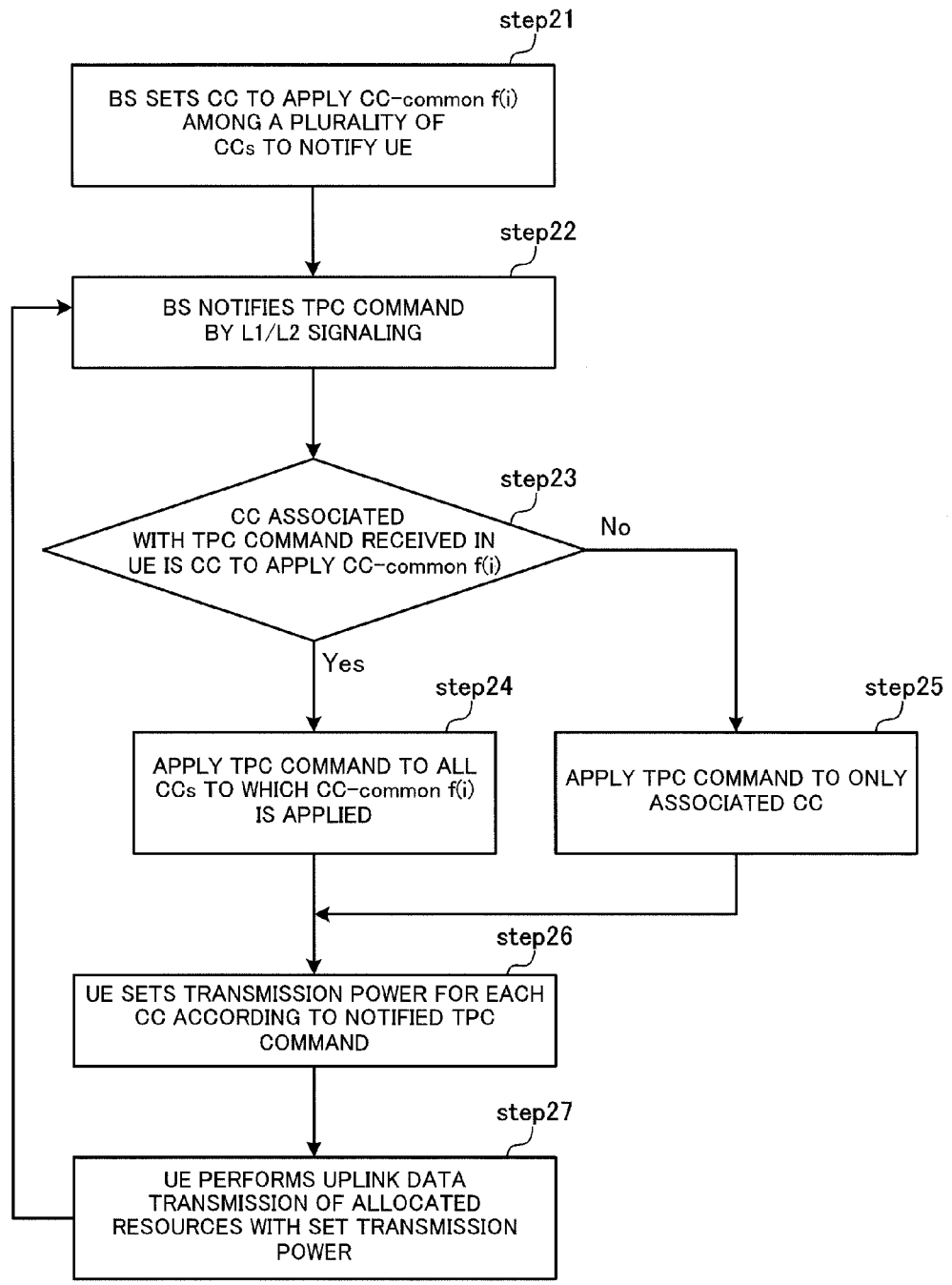
FIG. 11 is a flow diagram to explain second transmission power control according to the Embodiment of the invention.

Specific procedures of second transmission power control will be described below with reference to FIG. 11.

First, the radio base station apparatus 200 selects a particular component carrier group to apply a TPC command in common from among a plurality of component carriers, and notifies the mobile terminal apparatus of the group (step 21). For example, the apparatus 200 selects component carriers with the same frequency characteristics from among a plurality of component carriers as a particular component carrier group, and is capable of notifying for each mobile terminal apparatus using RRC signaling.

Next, the radio base station apparatus 200 notifies the mobile terminal apparatus 100 of TPC commands respectively applied to a plurality of component carriers by L1/L2 signaling (step 22).

The mobile terminal apparatus 100 determines whether a component carrier associated with the received TPC command corresponds to any one of the particular component carrier group (whether to set the common control mode) (step 23).

In the case that the component carrier associated with the received TPC command is included in the particular component carrier group (in the case of applying the common control mode), the apparatus 100 applies the received TPC command to all of the particular component carrier group in common (step 24), and sets transmission power of the particular component carrier group (step 26).

Meanwhile, in the case that the component carrier associated with the received TPC command does not correspond to any one of the particular component carrier group (in the case of applying the individual control mode), the apparatus 100 applies the received TPC command to the corresponding component carrier individually (step 25), and sets transmission power of the corresponding component carrier (step 26).

Next, the mobile terminal apparatus 100 performs uplink data transmission of allocated resources with the set transmission power (step 27).

Described below are configurations of the mobile terminal apparatus, radio base station apparatus and the like to which second transmission power control is applied. Described herein is the case of using the radio base station apparatus and mobile terminal apparatus that support systems of LTE-A scheme (LTE-A systems). In addition, the mobile communication system having the mobile terminal apparatus and radio base station apparatuses, functional configuration of the mobile terminal apparatus and functional configuration of the radio base station apparatus are the same as in FIGS. 5, 6 and 8 described previously, and specific descriptions thereof are omitted.

Figure 12:
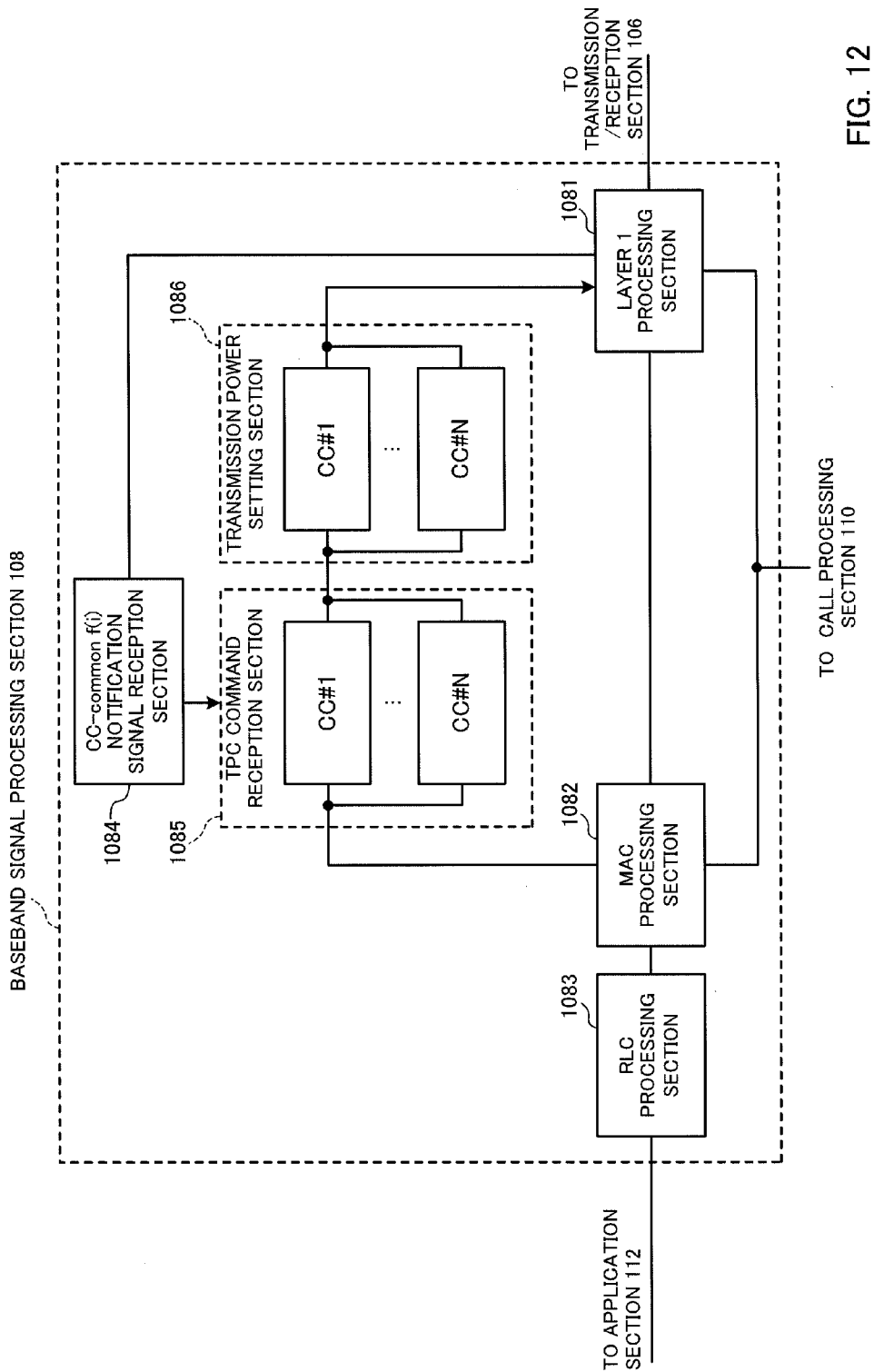
FIG. 12 is a diagram showing another example of the functional block diagram of the baseband signal processing section that the mobile terminal apparatus has according to the Embodiment of the invention.

A functional configuration of the baseband signal processing section of the mobile terminal apparatus will be described with reference to FIG. 12. FIG. 12 is a functional block diagram of the baseband signal processing section of the mobile terminal apparatus to which is applied second transmission power control.

The baseband signal processing section 108 has the layer 1 processing section 1081, MAC processing section 1082, RLC processing section 1083, common component carrier (CC-common f(i)) notification signal reception section 1084, TPC command reception section 1085, and transmission power setting section 1086.

The common component carrier notification signal reception section 1084 is notified of information on the particular component carrier group to which the TPC command is applied in common among a plurality of component carriers. It is possible to use RRC signaling transmitted from the radio base station apparatus for the information.

The TPC command reception section 1085 controls to apply the received TPC command to a predetermined component carrier, based on the information received in the common component carrier notification signal reception section 1084.

The transmission power setting section 1086 applies TPC commands received in the TPC command reception section 1085 to a plurality of component carriers respectively, and sets transmission power of each component carrier. More specifically, in the case that the component carrier associated with the TPC command received in the TPC command reception section 1085 is included in the particular component carrier group (in the case of applying the common control mode), the section 1086 applies the received TPC command to all of the particular component carrier group in common to set transmission power. Meanwhile, in the case that the component carrier associated with the TPC command received in the TPC command reception section 1085 does not correspond to any one of the particular component carrier group (in the case of applying the individual control mode), the section 1086 applies the received TPC commands to associated component carriers individually to set transmission power.

In other words, in second transmission power control, for component carriers to which the individual control mode is applied and one component carrier (component carrier associated with the TPC command used in common) among the component carrier group, transmission power is set by above-mentioned equation (1) using a correction value f(i) obtained from the TPC command determined corresponding to a communication environment between the base station apparatus and the mobile terminal apparatus. Meanwhile, for the other component carriers of the component carrier group, transmission power is set by above-mentioned equation (1) using the correction value f(i) obtained from the TPC command that is not determined directly corresponding to a communication environment between the base station apparatus and the mobile terminal apparatus. Thus, in second transmission power control, as distinct from the conventional case, since f(i) that is a closed-loop TPC parameter is set in the component carrier group in common to determine transmission power, used is the correction value f(i) obtained from the TPC command that is not determined directly corresponding to the communication environment between the base station apparatus and the mobile terminal apparatus. In addition, it is preferable that the component carrier group is comprised of component carriers such that frequency selective fading is regarded as being equal.

Figure 13:
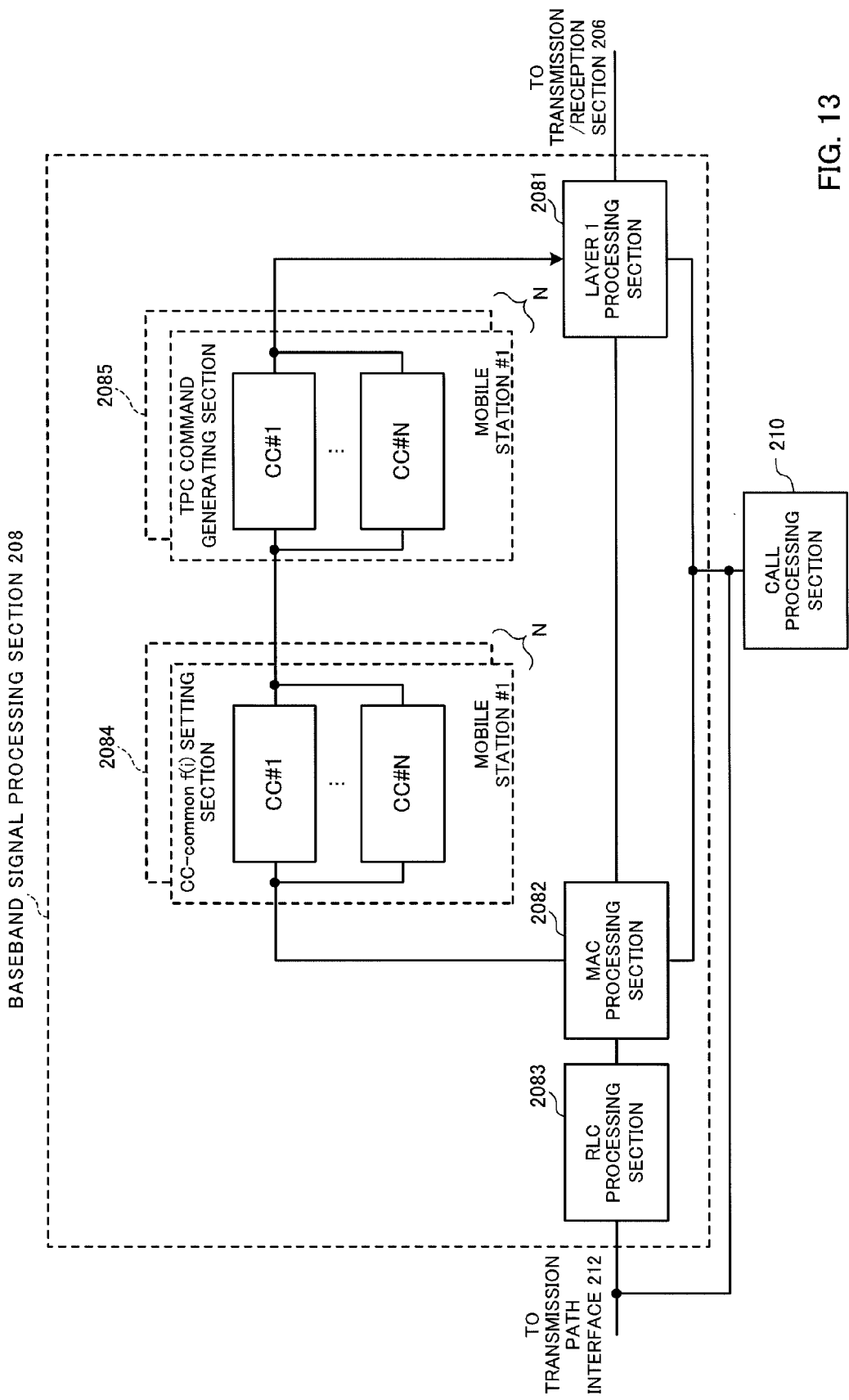
FIG. 13 is a diagram showing another example of the functional block diagram of the baseband signal processing section that the radio base station apparatus has according to the Embodiment of the invention.
Figure 14:
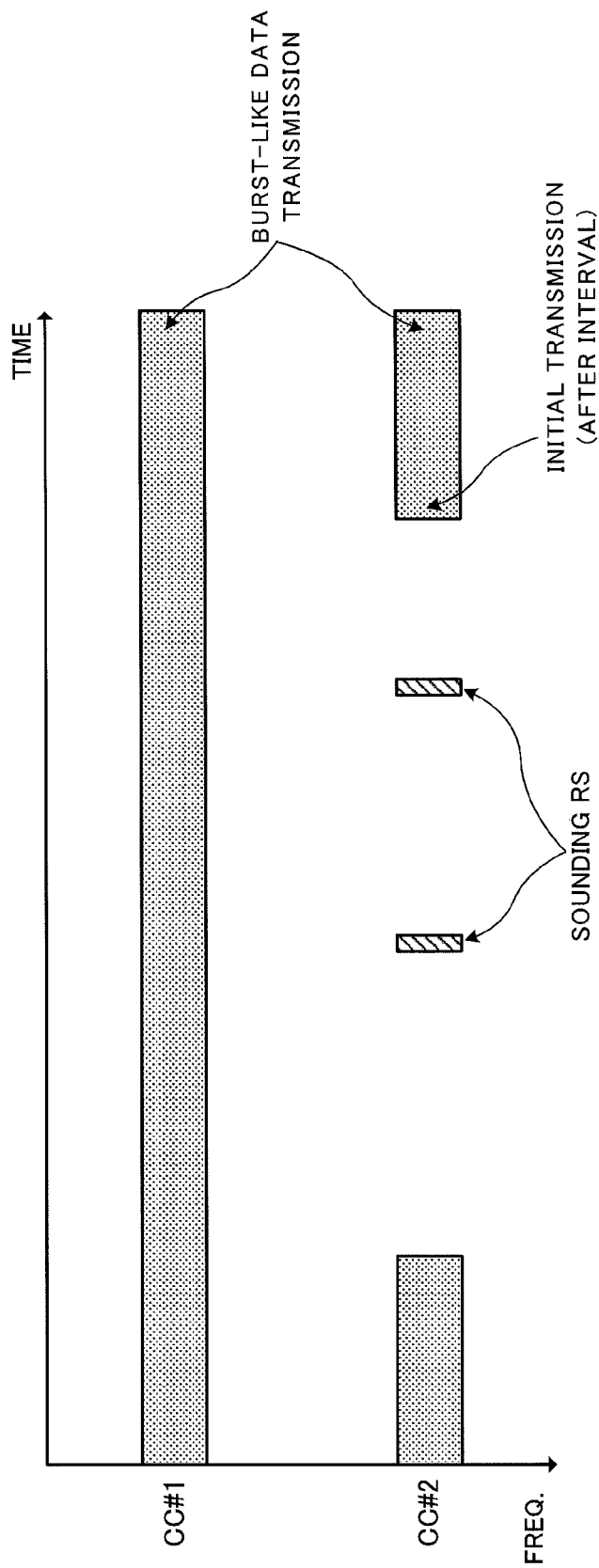
FIG. 14 is a diagram to explain transmission power control in transmitting a TPC command applied to each component carrier individually using a UL grant (DCI format0 and DCI format4).

Next, referring to FIG. 13, described is a functional configuration of the baseband processing section. FIG. 13 is a functional block diagram of the baseband signal processing section of the radio base station apparatus to which is applied second transmission power control.

As shown in FIG. 13, the baseband signal processing section 208 has the layer 1 processing section 2081, MAC (Medium Access Control) processing section 2082, RLC processing section 2083, common component carrier setting section 2084, and TPC command generating section 2085.

The common component carrier (CC-common f(i)) setting section 2084 sets a particular component carrier group to apply a TPC command in common among a plurality of component carriers of the mobile terminal apparatus to notify the mobile terminal apparatus. The information set in the common component carrier setting section 2084 is capable of being notified to the mobile terminal apparatus by RRC signaling.

The TPC command generating section 2085 generates a TPC command associated with each of a plurality of component carriers to notify the mobile terminal apparatus.

Hereinafter, described specifically is a transmission power control method using the mobile terminal apparatus and radio base station apparatus to which is applied second transmission power control.

First, in the common component carrier setting section 2084, the base station apparatus sets a particular component carrier group to apply a TPC command in common among a plurality of component carriers of the mobile terminal apparatus, and notifies the mobile terminal apparatus using RRC signaling. The mobile station apparatus receives the information on the particular component carrier group notified from the base station apparatus in the common component carrier notification signal reception section 1084.

Next, in the TPC command generating section 2085, the base station apparatus generates a TPC command associated with each component carrier to notify the mobile terminal apparatus. In the TPC command reception section 1085, the mobile terminal apparatus controls to apply the received TPC command to a predetermined component carrier based on the information received in common component carrier notification signal reception section 1084.

Next, in the transmission power setting section 1086, in the case that the component carrier associated with the TPC command received in the TPC command reception section 1085 is included in the particular component carrier group, the mobile station apparatus applies the received TPC command to all of the particular component carrier group in common to set transmission power. Meanwhile, in the case that the component carrier associated with the TPC command received in the TPC command reception section 1085 does not correspond to any one of the particular component carrier group, the mobile station apparatus applies the received TPC commands to associated component carriers individually to set transmission power.

Thus, according to the second transmission power control method according to this Embodiment, since the same TPC command is applied to particular component carriers in common, it is possible to control by relatively low L1/L2 signaling overhead, while setting transmission power by TPC commands with consideration given to the difference in frequency characteristics between a plurality of component carriers.

In addition, the Embodiment disclosed this time is illustrative in all the respects, and the present invention is not limited to the Embodiment. The scope of the invention is indicated by the scope of the claims rather than by the description of only the above-mentioned Embodiment, and is intended to include senses equal to the scope of the claims and all modifications within the scope of the claims.

INDUSTRIAL APPLICABILITY

As described above, the present invention has the effect that it is possible to suitably control uplink transmission power of a mobile terminal apparatus that performs radio communications in a system band including a plurality of component carriers, and is useful particularly in the transmission power control method, radio base station apparatus and mobile terminal apparatus for controlling uplink transmission power.

The present application is based on Japanese Patent Application No. 2010-141062 filed on Jun. 21, 2010, entire content of which is expressly incorporated by reference herein.

The invention claimed is:

1. A transmission power control method of controlling uplink transmission power of a mobile terminal apparatus that performs radio communications in a system band including a plurality of component carriers, comprising:
   receiving a transmission power control command that is associated with a predetermined component carrier and is generated in a radio base station apparatus;
   receiving offset information for compensating for a reception quality difference between the plurality of component carriers measured in the radio base station apparatus; and
   applying the received transmission power control command to at least a particular component carrier group in common and setting transmission power of each component carrier based on the offset information,
   wherein the particular component carrier group includes the predetermined component carrier and a component carrier whose frequency characteristics are different from those of the predetermined component carrier.

2. The transmission power control method according to claim 1, wherein the offset information is information on target transmission power specific to each component carrier determined corresponding to the reception quality difference in the each component carrier.

3. The transmission power control method according to claim 1, wherein information on the particular component carrier group to apply the same transmission power control command among the plurality of component carriers is notified from the radio base station apparatus using RRC signaling.

4. The transmission power control method according to claim 1, wherein transmission power of the each component carrier is obtained from following equation (1):

$$P_{PUSCH}(i) = \min\{P_{CMAX}, 10\log_{10}(M_{PUSCH}(i)) + P_{0\_PUSCH}(j) + \alpha(j) \cdot PL + \Delta_{TF}(i) + f(i)\} \quad \text{Eq. (1)}$$

herein, $P_{CMAX}$ is maximum transmission power, $M_{PUSCH}$ is a transmission bandwidth, $P_{0\_PUSCH}$ is target reception power (in a case of PL=0), $\alpha$ is a weighting factor of Fractional transmission power control, PL is a path loss measurement value, $\Delta_{TF}$ is an offset dependent on MCS, and f(i) is a correction value by a transmission power control command.

5. A mobile terminal apparatus that performs radio communications in a system band including a plurality of component carriers, comprising:
   a transmission power control command reception section configured to receive a transmission power control command that is associated with a predetermined component carrier and is generated in a radio base station apparatus; and
   a transmission power setting section configured to apply the transmission power control command received in the transmission power control command reception section to at least a particular component carrier group in common, and sets transmission power of each component carrier based on offset information for compensating for a reception quality difference between the plurality of component carriers measured in the radio base station apparatus, wherein the particular component carrier group includes the predetermined component carrier and a component carrier whose frequency characteristics are different from those of the predetermined component carrier.

6. The mobile terminal apparatus according to claim 5, further comprising:

a target reception power reception section configured to receive information on target reception power specific to the each component carrier corresponding to a reception quality difference between the plurality of component carriers, wherein the transmission power setting section applies the target reception power information to setting of transmission power of the each component carrier.

7. The mobile terminal apparatus according to claim 5, wherein the transmission power setting section applies the transmission power control command to all of the component carriers included in the system band in common.

8. The mobile terminal apparatus according to claim 5, wherein information on the particular component carrier group is notified using RRC signaling.

9. The mobile terminal apparatus according to claim 7, wherein the transmission power setting section obtains transmission power of the each component carrier from following equation (2):

$$P_{PUSCH}(i) = \min\{P_{CMAX}, 10\log_{10}(M_{PUSCH}(i)) + P_{0\_PUSCH}(j) + \alpha(j) \cdot PL + \Delta_{TF}(i) + f(i)\} \quad \text{Eq. (2)}$$

herein, $P_{CMAX}$ is maximum transmission power, $M_{PUSCH}$ is a transmission bandwidth, $P_{0\_PUSCH}$ is target reception power (in a case of PL=0), $\alpha$ is a weighting factor of Fractional transmission power control, PL is a path loss measurement value, $\Delta_{TF}$ is an offset dependent on MCS, and f(i) is a correction value by a transmission power control command.

10. A radio base station apparatus comprising:

a common component carrier setting section configured to set a particular component carrier group to apply a transmission power control command in common among a plurality of component carriers, for a mobile terminal apparatus that performs radio communications in a system band including the plurality of component carriers, to notify the mobile terminal apparatus;

a target reception power generating section configured to measure a reception quality difference in each component carrier in at least the particular component carrier group, for the mobile terminal apparatus that performs radio communications in the system band including the plurality of component carriers, and generates target reception power specific to each component carrier corresponding to the reception quality difference to notify the mobile terminal apparatus; and a transmission power control command generating section configured to generate transmission power control commands respectively associated with the plurality of component carriers to notify the mobile terminal apparatus, wherein the transmission power control command that is associated with a predetermined component carrier is used by the mobile terminal apparatus to set transmission power of each component carrier based on the target reception power, and the particular component carrier group includes the predetermined component carrier and a component carrier whose frequency characteristics are different from those of the predetermined component carrier.

11. A communication system provided with a radio base station apparatus and a mobile terminal apparatus notified of a transmission power control command to control uplink transmission power from the radio base station apparatus, wherein the mobile terminal apparatus has a transmission power control command reception section configured to receive a transmission power control command that is associated with a predetermined component carrier and is generated in the radio base station apparatus, and a transmission power setting section configured to apply the transmission power control command received in the transmission power control command reception section to at least a particular component carrier group in common, and set transmission power of each component carrier based on offset information for compensating for a reception quality difference between the plurality of component carriers measured in the radio base station apparatus, wherein the particular component carrier group includes the predetermined component carrier and a component carrier whose frequency characteristics are different from those of the predetermined component carrier.

* * * * *